(12) United States Patent
Baumgarte et al.

(10) Patent No.: US 11,865,763 B2
(45) Date of Patent: Jan. 9, 2024

(54) METHOD AND DEVICE FOR PRODUCING CONTAINERS, FILLED WITH LIQUID FILLING MATERIAL, FROM THERMALLY CONDITIONED PREFORMS

(71) Applicant: KHS GmbH, Dortmund (DE)

(72) Inventors: Rolf Baumgarte, Ahrensburg (DE);
Michael Linke, Hamburg (DE);
Michael Litzenberg, Börnsen (DE)

(73) Assignee: KHS GmbH, Dortmund (DE)

( * ) Notice: Subject to any disclaimer, the term of this patent is extended or adjusted under 35 U.S.C. 154(b) by 121 days.

(21) Appl. No.: 17/612,609

(22) PCT Filed: Jun. 3, 2020

(86) PCT No.: PCT/EP2020/065258
§ 371 (c)(1),
(2) Date: Nov. 19, 2021

(87) PCT Pub. No.: WO2020/245138
PCT Pub. Date: Dec. 10, 2020

(65) Prior Publication Data
US 2022/0219374 A1    Jul. 14, 2022

(30) Foreign Application Priority Data
Jun. 4, 2019  (DE) .................... 10 2019 114 953.3

(51) Int. Cl.
*B29C 49/46*  (2006.01)
*B29C 49/36*  (2006.01)
(Continued)

(52) U.S. Cl.
CPC .............. *B29C 49/46* (2013.01); *B29C 49/36* (2013.01); *B29C 49/06* (2013.01);
(Continued)

(58) Field of Classification Search
CPC ......... B29C 49/46; B29C 49/36; B29C 49/06; B29C 2049/4664; B29C 2049/023;
(Continued)

(56) References Cited

U.S. PATENT DOCUMENTS 9,044,887 B2 *  6/2015  Cooper ................... B29C 49/46
9,573,705 B2 *  2/2017  Chauvin ................. B65B 3/022
(Continued)

FOREIGN PATENT DOCUMENTS

DE   102010007541 A1   6/2011
DE   102018106930 A1   9/2019
(Continued)

OTHER PUBLICATIONS

International Search Report dated Sep. 17, 2020 filed in PCT/EP2020/065258.

*Primary Examiner* — Nicolas A Arnett
(74) *Attorney, Agent, or Firm* — Rankin, Hill & Clark LLP

(57) ABSTRACT

A method for producing containers, filled with liquid filling material, from thermally conditioned preforms, in which method the filling material is introduced under pressure through a filling valve into the preform at a forming and filling station, wherein the filling material is provided by a filling material source and is pumped into the preform by means of a displacement pump, which is provided between the filling material source and the forming and filling stations, when the filling valve is open, wherein at least two forming and filling stations (12, 14, 11, 13, 32, 33) are associated with each displacement pump (23, 24, 36), which forming and filling stations are supplied, in particular successively, with filling material by the displacement pump (23, 24, 36).

16 Claims, 2 Drawing Sheets

Figure 1:
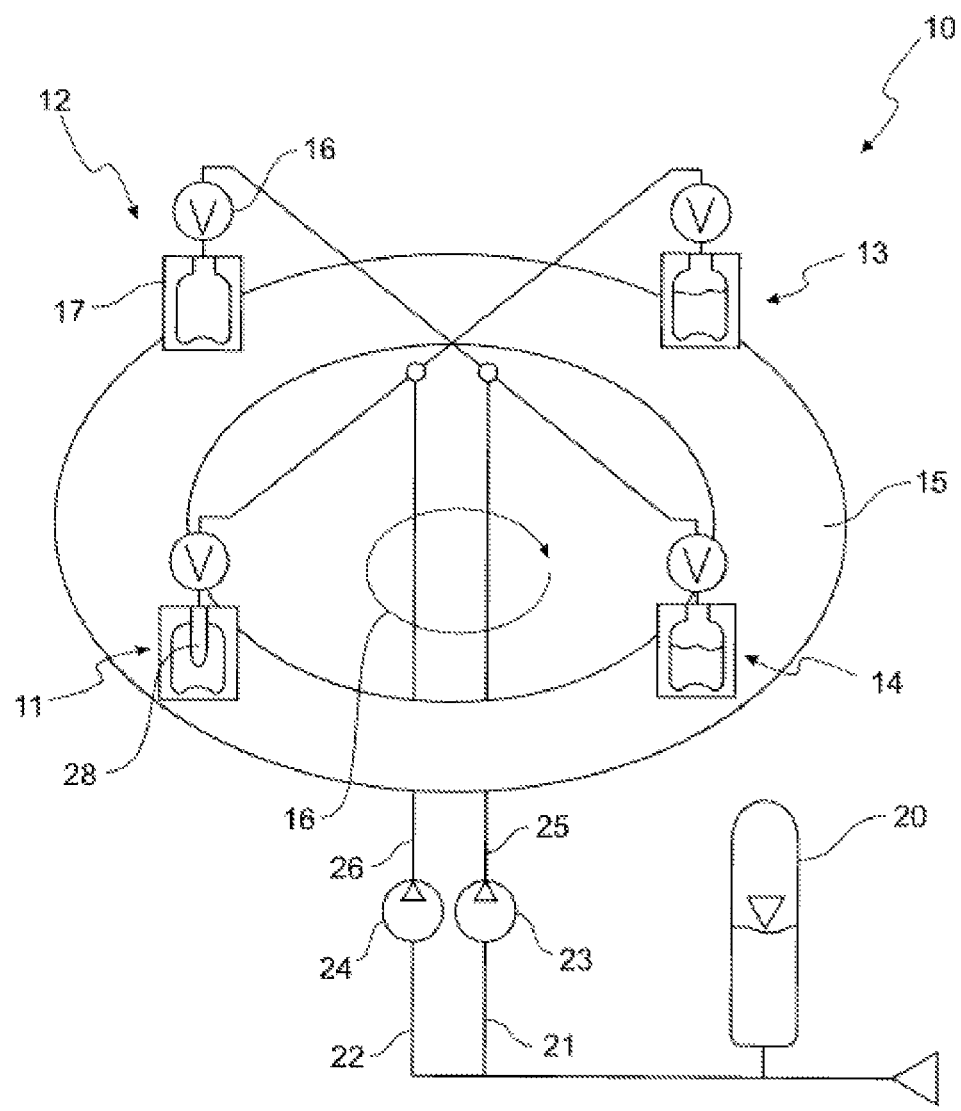

(51) Int. Cl.
*B29L 31/00* (2006.01)
*B67C 3/22* (2006.01)
*B29C 49/06* (2006.01)

(52) U.S. Cl.
CPC ............... *B29C 2049/4664* (2013.01); *B29L 2031/7158* (2013.01); *B67C 2003/227* (2013.01)

(58) Field of Classification Search
CPC ..... B29C 2949/0715; B29L 2031/7158; B67C 2003/227
See application file for complete search history.

(56) References Cited

U.S. PATENT DOCUMENTS

| | | | | |
|---|---|---|---|---|
| 9,724,868 B2 * | 8/2017 | Chauvin | ............... | B29C 49/46 |
| 9,963,254 B2 * | 5/2018 | Chauvin | ............... | B67C 3/225 |
| 9,987,790 B2 * | 6/2018 | Suyama | ............... | B29C 49/16 |
| 10,675,804 B2 * | 6/2020 | Litzenberg | ............... | B29C 49/58 |
| 10,940,632 B2 * | 3/2021 | Shiokawa | ............... | B65B 3/022 |
| 11,045,992 B2 * | 6/2021 | Okuyama | ............... | B29C 49/46 |
| 11,465,329 B2 * | 10/2022 | Ishii | ............... | B29C 49/12 |
| 2012/0266567 A1 * | 10/2012 | Haesendonckx | ..... | B29C 49/783 53/558 |
| 2013/0328248 A1 * | 12/2013 | Herold | ............... | B29D 22/003 425/526 |
| 2014/0157734 A1 * | 6/2014 | Chauvin | ............... | B65B 3/022 53/574 |
| 2014/0356475 A1 * | 12/2014 | Sato | ............... | B29C 49/06 425/524 |
| 2015/0076105 A1 * | 3/2015 | Sato | ............... | B29C 49/78 53/111 R |
| 2016/0144550 A1 * | 5/2016 | Kumar | ............... | B29C 49/16 425/524 |
| 2019/0275725 A1 * | 9/2019 | Kitzinger | ............... | B29C 49/46 |
| 2019/0291329 A1 * | 9/2019 | Kitzinger | ............... | B29C 49/783 |
| 2019/0337216 A1 * | 11/2019 | Litzenberg | ............... | B29C 49/06 |

FOREIGN PATENT DOCUMENTS

| | | |
|---|---|---|
| WO | 2012083910 A1 | 6/2012 |
| WO | 2013020885 A1 | 2/2013 |
| WO | 2018141347 A1 | 8/2018 |

* cited by examiner

METHOD AND DEVICE FOR PRODUCING CONTAINERS, FILLED WITH LIQUID FILLING MATERIAL, FROM THERMALLY CONDITIONED PREFORMS

The invention relates to a method according to the preamble of claim 1 and a device according to the preamble of claim 7.

Generic methods and devices are used in container forming and filling systems. In such systems, thermally conditioned preforms are simultaneously expanded into the desired container shape by introducing liquid filling material under high pressure at a forming and filling station, and the containers being formed are filled. During the forming and filling process, the preforms are arranged in a mold of the forming and filling station which defines the final desired container shape.

The preforms are thermally conditioned, e.g., in heating lanes or heating sections, as described, for example, in WO 2012/083910 A1.

The mentioned forming and filling systems are known in the prior art. Reference is made to DE 10 2010 007 541 A1 in this regard.

Forming and filling systems are intended to replace conventional systems in which a separate blow molding and a separate filling station are provided. In conventional systems, the thermally conditioned preforms are, in two steps, first formed into the finished containers in a blow molding station by introducing gas under high pressure, which containers are then filled in the filling station in a next step.

In the case of the forming and filling systems mentioned here, however, forming and filling takes place in one step. As already mentioned above, the filling material is fed into the preforms under high pressure at the desired metering rate and the desired number of cycles. Typical filling times are in the range of 100-150 ms, which requires volume flows of up to 20 liters/s and pressures of up to 40 bar.

With regard to these requirements, devices of the generic type are provided in known forming and filling systems, for example, which are intended to enable the required pressures and volume flows.

The filling material is provided by a filling material source, usually a filling material reservoir, which is, via a feed line, connected to a filling valve that controls the flow to the preforms.

Usually, the filling material reservoir is a pressure reservoir pressurized by a pressure pump, which pressure reservoir discharges the product into the feed line at a defined pressure.

In known devices, furthermore, a displacement pump is arranged between the filling material source and the filling valve. The filling material source is in fluid communication with the displacement pump via a first inlet-side section of the feed line, which in turn is connected to the filling valve via a second outlet-side section of the feed line.

The displacement pump serves in particular to provide the required pressure and volume flow with which the filling material is discharged into the preform or the container being formed via the second section of the feed line when the filling valve is open.

In methods and devices of the generic type, it is provided that one displacement pump is associated with one forming and filling station in each case. This represents a relatively high structural effort and also requires high maintenance. Such prior art is shown in WO2018/141347 A1 and DE 10 2018 106 930 A1.

It is the object of the invention to provide a method with which this effort can be reduced. It is another object to provide a device that requires less installation space and can be operated more cost-effectively.

These objects are achieved with a method that has the characterizing features of claim 1 and with a device that has the characterizing features of claim 7.

Advantageous configurations are specified in the dependent claims.

As is known from the prior art, the method according to the invention works with a filling material source which provides the desired amount of filling material.

The filling material source is in flow communication with the forming and filling station.

Furthermore, a displacement pump is provided between the filling material source and the forming and filling station, which displacement pump generates the pressure and volume flow required for filling and forming the preform, or the different volume flows required. Usually, the preforms are not filled and formed at a constant volume flow. Often a lower volume flow of, e.g., 2 liters/sec, is used initially, then a higher volume flow of, e.g., 5 liters/sec, and finally again a lower volume flow of, e.g., 2 liters/sec, is used. These are only exemplary values. Depending on the material and volume of the preform, other volume flow profiles with pumping rates of up to 20 liters/sec, for example, can also be used. These can be implemented without any problems by appropriate control of the displacement pump.

The term filling material source is to be interpreted broadly. It can be, for example, a dispensing station at a system, with which the filling material is produced. If the device is located, for example, at a different location, a filling material reservoir is usually used as the source.

The discharge of filling material from the filling material source can take place without pressure or under pressure.

In the case of pressure-free discharge, the displacement pumps would have to be designed in such a way that they can suck in the filling material. Alternatively, it would also be conceivable to provide a further pump in the feed line, with which the filling material can be pumped from the filling material source to the displacement pump.

Preferably, a filling material source is provided which discharges the filling material under pressure. It can be, for example, a filling material pressure reservoir to which filling material is applied by a continuously running pump under pressure. The use of a source that discharges the product under pressure has hydraulic advantages and allows a smaller design of the displacement pumps, for example.

According to the invention, it is now provided that at least two forming and filling stations are associated with each displacement pump, at which forming and filling stations the displacement pump can pump filling material into the preforms.

A pumping process would look something like this that first the pump is started and the filling valve of the associated filling and forming station is opened. Then, the pump would apply the filling material to the preform at a desired volume flow profile and pressure, and after completion of the forming and filling process, the filling valve would be closed again and the pump would be stopped. This process is also to be referred to hereinafter by the term "supply".

It is conceivable that a displacement pump supplies the at least two associated forming and filling stations in parallel or in a temporally overlapping manner. For this purpose, it would be sufficient to adjust the filling material volume and the pumping capacity of the displacement pump accordingly. However, in industrial processes, the temperaturecontrolled preforms are fed one after the other to the forming and filling stations of a device and processed further as soon as possible in order to prevent the preform from cooling down too much before it is reformed.

Here, it can be machines that work in cycles or, preferably, machines that operate according to the rotary principle, in which the forming and filling stations are arranged on a rotating work wheel. In any case, in such processes no two preforms are available for filling and shaping at the same time over the same period of time. A parallel filling of these two preforms, which are offset by at least one cycle or temporally, with a matching volume flow profile and with one pump would therefore be problematic in industrial processes. Filling that overlaps temporally would only be possible with a constant volume flow.

It is therefore preferably provided that the displacement pump supplies the forming and filling stations associated with it successively.

It is furthermore preferably provided that a plurality of displacement pumps are provided which together supply a plurality of forming and filling stations in a defined sequence. In this configuration it is provided that, between the forming and filling stations supplied by a pump, there is at least one forming and filling station which is supplied by another displacement pump. In this way, higher cycle rates or, in the case of devices with a work wheel, higher rotational speeds can be achieved. It is conceivable, e.g., that the displacement pumps successively each supply the first forming and filling station associated with them and then, correspondingly, the at least one further associated forming and filling station. In the last-mentioned configurations, filling of preforms that overlap temporally would then also be possible.

If one takes as an example a work wheel with a cycle time of 1800 ms, on which the forming and filling stations are arranged, 6 stations could be supplied successively with a pump that takes 300 ms for a forming and filling process. With 2 pumps that alternately supply successive stations, 12 stations could be supplied, with 3 pumps 18, and so on.

The invention also relates to a device for producing containers filled with liquid filling material.

As is known from the prior art, in the device filling material is discharged from a source into a feed line to the filling valve of a forming and filling station. A displacement pump is provided between the filling material source and the forming and filling station, which is connected to the liquid source via an inlet-side section of the feed line, and to the filling valve of the forming and filling station via an outlet-side section. The displacement pump is designed in such a way that it can pump the filling material provided by the filling material source with the desired volume flow profile and pressure into a preform.

With regard to the interpretation of the term "filling material source", reference is made to the statements above. In addition, it should be mentioned that the filling material source, for example a reservoir or a pressure reservoir, can be part of the device, but can also be provided separately, that is to say externally, for this purpose.

According to the invention it is provided that the displacement pump is in flow communication with at least two forming and filling stations, and is controlled and designed in such a way that it supplies the stations in particular successively with the required product volume at the desired rate.

Compared to the devices known from the prior art, in which one displacement pump is associated with one forming and filling station in each case, the device according to the invention represents a considerable structural saving.

It is conceivable that the displacement pump is a reciprocating piston pump, which in each case executes partial strokes to supply the associated forming and filling stations. The disadvantage of reciprocating piston pumps is that they first have to be filled with the filling material volume and then discharge it in a second step. The piston pump is filled via a loading valve, which makes the construction relatively complex and slow.

Circular pumps are therefore preferably provided as displacement pumps with, for example, meshing pistons or gear wheels, in particular screw, rotary or rotary piston pumps. Rotary pumps do not require any loading valves and can usually be cleaned without leaving any residues by means of flushing, etc. CIP cleaning (cleaning in place) is thus possible. In addition, they can convey forwards and backwards without any problems, which can be utilized, for example, after the forming and filling process to set a desired filling level in the container or in the case of a pressure-free liquid source.

To supply a forming and filling station, it is only necessary to switch on the pumps and generate the desired volume flow profile by setting a defined rotational speed, for example of the meshing circular or rotary pistons. Suitable pumps are known in the prior art and are available on the market in many different versions.

As is known from the prior art, in the device according to the invention, the forming and filling stations can preferably be arranged on a rotating work wheel. The displacement pumps can also be arranged on the work wheel. However, it is also conceivable to provide the displacement pumps outside the working wheel and to connect them to the working wheel and the forming and filling stations arranged thereon via a rotary feedthrough. The same applies to the filling material reservoir or filling material pressure reservoir. These can also be provided outside the work wheel or rotating with it. Furthermore, a filling material source can be associated with each displacement pump. It is also conceivable, however, that a source, e.g., filling material pressure reservoir with a corresponding design, is connected to several displacement pumps.

The invention will be explained in more detail below with the aid of two figures.

Figure 2:
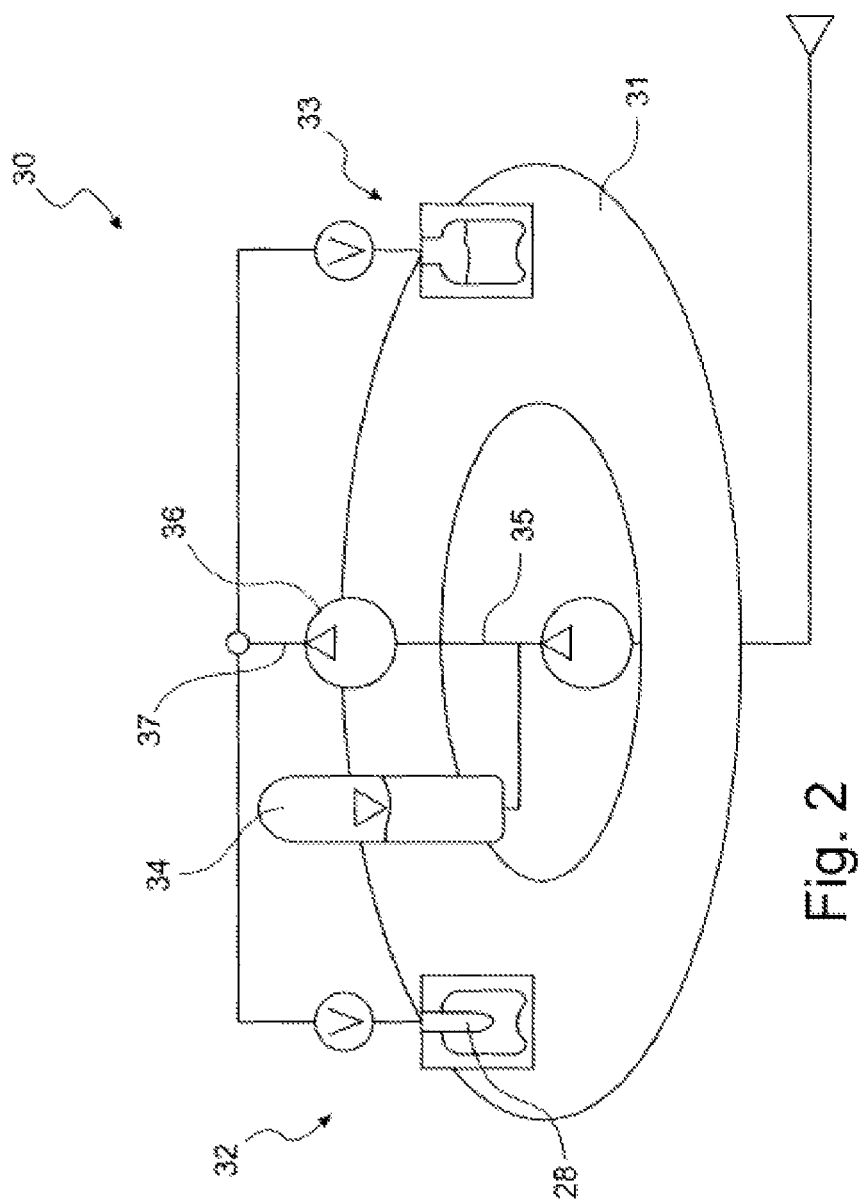

FIG. 1 shows an exemplary embodiment of the device and method according to the invention, and FIG. 2 shows another exemplary embodiment.

FIG. 1 shows a device 10 in which four forming and filling stations 11, 12, 13 and 14 are arranged on a work wheel 15 which rotates in the direction of arrow 16. Usually, more forming and filling stations are provided on a work wheel, e.g. 12. The reduction to four stations is done for reasons of clarity. Preforms 28, which are thermally conditioned, are transferred to the work wheel or a forming and filling station arranged thereon by a device (not shown) in one position. In the case shown, this is, e.g., the position in which the forming and filling station 11 is located. The preforms 28 are then formed into containers and filled with further rotation of the working wheel 15 (not shown) and the finished, filled containers in, for example, the position in which the forming and filling station 14 is located, are handed over to a further treatment device, e.g. a closer or to a labeler.

Each of the forming and filling stations 11-14 has a filling valve 16 and a mold 17 which defines the final shape of the preform to be filled and formed. Outside the work wheel 15, a filling material pressure reservoir 20 is provided, to which filling material is applied by a pump (not shown). As mentioned above, a filling material pressure reservoir represents a preferred configuration of a filling material source. However, other filling material sources are of course also conceivable.

The filling material pressure reservoir 20 is in fluid communication with displacement pumps 23 and 24 via inlet-side sections 21 and 22 of a feed line. The pumps 23 and 24 for their part are in flow communication with the forming and filling stations 11-14 via outlet-side sections 25 and 26 of a feed line.

In the case shown, the displacement pump 23 is associated with the forming and filling stations 12 and 14, while the displacement pump 24 supplies the forming and filling stations 11 and 13. The forming and filling station 11 is first supplied by the pump 24. With further rotation of the working wheel 15, a new preform 28 is then inserted into the forming and filling station 14 and this preform is filled by means of the other displacement pump 23. The next step is the forming and filling station 13, which in turn is supplied by the pump 24, etc.

It is understood that, as already stated above, further forming and filling stations can be arranged on the work wheel, e.g. 12. Of these 12 forming and filling stations, at least two, but also more stations, can each be supplied by one displacement pump. Conceivable would be, e.g., to provide four pumps for a work wheel with 12 positions, each supplying three forming and filling stations. The supply of successive forming and filling stations by different displacement pumps has the advantage that faster cycle rates or rotational speeds of the work wheel can be implemented.

As already stated above, in the case shown, the filling material is provided under pressure by the pressure reservoir 20, while the displacement pumps 23 and 24 provide the required volume flow and pressure during the filling and forming of the preforms. Volume flows of up to 20 lts, for example, are conceivable. Usually, the volume flow varies during filling. It is conceivable, e.g., to begin with a lower volume flow, then to increase it and then to lower it again towards the end of the filling process. It is of course also conceivable to provide other volume flow profiles. This essentially depends on the material of the preforms etc.

FIG. 2 essentially shows a device 30 similar to that shown in FIG. 1.

Again, there is a work wheel 31 on which the forming and filling stations 32 and 33 are arranged. A preform 28 is inserted into the forming and filling station 32. Here, too, a filling material pressure reservoir 34 is provided, which provides filling material under pressure. The filling material pressure reservoir 34 is connected to a displacement pump 36 via an inlet-side section of a feed line 35. The displacement pump 36 is in turn connected to the filling stations 32 and 33 via an outlet-side section 37. In contrast to the device shown in FIG. 1, the pressure reservoir 34 and the displacement pump 36 are arranged on the working wheel 31 so that they rotate together. The advantage is that the distance between the displacement pump and the filling valve is relatively short. On the other hand, it must also be taken into account that the arrangement of components on the work wheel 31 increases its weight, which under certain circumstances has design disadvantages.

The invention claimed is:

1. A method for producing containers that are filled with a liquid filling material from thermally conditioned preforms, the method comprising:

introducing the liquid filling material under pressure through a first filling valve, when the first filling valve is open, into a first preform at a first forming and filling station; and successively introducing the liquid filing material under pressure through a second filing valve, when the second filling valve is open, into a second preform at a second forming and filling station;

wherein the filling material is supplied from a filling material source, wherein the filling material is introduced into the first preform by a first displacement pump, wherein the filling material is successively introduced into the second preform by the same first displacement pump that previously introduced the filling material into the first preform, and wherein the first displacement pump is provided between the filling material source and the first forming and filling station and the second forming and filling station.

2. The method according to claim 1, wherein the filling material source is a filling material reservoir.

3. The method according to claim 1, wherein the filling material source is a filling material pressure reservoir.

4. The method according to claim 1, further comprising:

introducing the liquid filling material under pressure through a third filling valve, when the third filling valve is open, into a third preform at a third forming and filling station; and successively introducing the liquid filling material under pressure through a fourth filing valve, when the fourth filling valve is open, into a fourth preform at a fourth forming an filling station;

wherein the filling material is supplied from the filling material source, wherein the filling material is introduced into the third preform by a second displacement pump, wherein the filling material is successively introduced into the fourth preform by the same second displacement pump that previously introduced the filling material into the third preform, and wherein the second displacement pump is provided between the filling material source and the third forming and filling station and the fourth forming and filling station, and wherein the third forming and filling station is arranged in a transport direction of the thermally conditioned preforms between the first forming and filling station and the second forming and filling station.

5. The method according to claim 4, wherein the first displacement pump and the second displacement pump introduce the liquid filling material under pressure into the first preform at the first forming and filling station and the third preform at the third forming and filling station, respectively, and then correspondingly and successively introduce the liquid filing material under pressure into the second preform at the second forming and filling station and into the fourth preform at the fourth forming and filling station, respectively.

6. The method according to claim 1, wherein the first forming and filling station and the second forming and filling station are supplied with the liquid filling material in a temporally overlapping manner.

7. The method according to claim 1, wherein the first forming and filling station and the second forming and filling station are both arranged on a work wheel.

8. A device for producing containers that are filled with a liquid filling material from thermally conditioned preforms, the device comprising:
- first and second forming and filling stations;
- a filling material source in fluid communication with respective filling valves of the first and second forming and filling stations via a feed line; and
- a displacement pump connected to the filling material source via an inlet-side section of the feed line and to the respective filling valves of the first and second forming and filling stations via an outlet-side section;
- wherein the displacement pump is configured to discharge the liquid filling material into the outlet-side section of the feed line with a pressure and volume flow profile required for forming the thermally conditioned preforms into containers that are filled with the liquid filling material, and
- wherein the displacement pump is configured to supply the liquid filling material to the first forming and filling station and successively to the second forming and filling station.

9. The device according to claim 8, wherein the filling material source is a filling material reservoir.

10. The device according to claim 8, wherein the filling material source is a filling material pressure reservoir.

11. The device according to claim 8, wherein the displacement pump is a rotating pump.

12. The device according to claim 11, wherein the rotating pump is a screw spindle, circular pump or rotary piston pump.

13. The device according to claim 8, wherein the device comprises a plurality of displacement pumps, wherein each of said plurality of displacement pumps is configured to supply the liquid filling material to a plurality of forming and filling stations successively, and wherein a separate filling material source is associated with each of the plurality of displacement pumps.

14. The device according to claim 13, wherein the each separate filling material source is a filling material pressure reservoir.

15. The device according to claim 8, wherein the forming and filling stations are arranged on a rotating work wheel.

16. The device according to claim 15, wherein at least one of the displacement pump and the filling material source is not arranged on the work wheel.

* * * * *